(12) United States Patent  
Frye et al.

(10) Patent No.: US 10,549,658 B2  
(45) Date of Patent: Feb. 4, 2020

(54) AUTOMOTIVE VEHICLE SEAT WITH INDENTED LOWER SIDE PORTIONS

(71) Applicant: Rivian IP Holdings, LLC, Plymouth, MI (US)

(72) Inventors: James H. Frye, Plymouth, MI (US); David Schneider, Ann Arbor, MI (US); Jared Odle, Westland, MI (US)

(73) Assignee: Rivian IP Holdings, LLC, Plymouth, MI (US)

( * ) Notice: Subject to any disclaimer, the term of this patent is extended or adjusted under 35 U.S.C. 154(b) by 0 days.

(21) Appl. No.: 15/963,176

(22) Filed: Apr. 26, 2018

(65) Prior Publication Data

US 2019/0329676 A1 Oct. 31, 2019

(51) Int. Cl.
| | |
|---|---|
| *B60N 2/62* | (2006.01) |
| *B60N 2/64* | (2006.01) |
| *B60N 2/24* | (2006.01) |
| *B60N 2/803* | (2018.01) |
| *B60N 2/68* | (2006.01) |
| *B60N 2/66* | (2006.01) |

(52) U.S. Cl.  
CPC ............... *B60N 2/24* (2013.01); *B60N 2/682* (2013.01); *B60N 2/803* (2018.02); *B60N 2/66* (2013.01)

(58) Field of Classification Search  
CPC ........... B60N 2/24; B60N 2/803; B60N 2/682  
USPC ............ 297/452.33, 452.34, 440.15, 440.16, 297/452.56, 452.23, 452.25  
See application file for complete search history.

(56) References Cited

U.S. PATENT DOCUMENTS

| | | | | |
|---|---|---|---|---|
| 3,259,435 | A * | 7/1966 | Jordan, Jr. ............... | A47C 3/12 297/452.2 X |
| 3,604,752 | A * | 9/1971 | Macknick .............. | B60N 2/682 297/452.2 |
| 3,674,307 | A * | 7/1972 | Dove ..................... | B60N 2/682 297/452.33 X |
| 3,995,893 | A * | 12/1976 | De La Taille .......... | A47C 5/06 297/452.2 X |
| 4,492,408 | A * | 1/1985 | Lohr ....................... | B60N 2/00 297/452.18 X |

(Continued)

OTHER PUBLICATIONS

Britax, History & Heritage, retrieved from the Internet at https://us.britax.com/why-britax/history-heritage/ on Sep. 26, 2018, 8 pages.

*Primary Examiner* — Rodney B White  
(74) *Attorney, Agent, or Firm* — Jones Day (57) ABSTRACT

A seat for an automotive vehicle includes a seat bottom and a seat back. The seat bottom includes a first frame and a seating surface, and the seat back includes a second frame. A first attachment mechanism is configured to secure the first frame of the seat bottom to the automotive vehicle. The seat back includes an upper portion, and a lower portion, and a middle portion between the upper portion and the lower portion. A second attachment mechanism is configured to connect the seat back and the seat bottom. The seat bottom and seat back being configured such that a lateral width of the upper portion of the seat back is greater than a lateral width of the lower portion of the seat back, a lateral width of the seat bottom is greater than the lateral width of the lower portion of the seat back, and a gap is located between the upper portion of the seat back and a rear portion of the seat bottom at a right side and/or a left side of the seat back.

17 Claims, 3 Drawing Sheets

(56) References Cited

U.S. PATENT DOCUMENTS

| | | | | |
|---|---|---|---|---|
| 4,537,446 A * | 8/1985 | Roney | | B60N 2/38 297/464 |
| 4,615,561 A * | 10/1986 | Nomura | | A47C 7/74 297/452.34 X |
| 4,623,196 A * | 11/1986 | Roney | | B60N 2/38 296/68.1 |
| 4,679,854 A * | 7/1987 | Putsch | | B60N 2/00 297/486 |
| 4,883,320 A * | 11/1989 | Izumida | | A47C 7/282 297/452.34 X |
| 4,969,688 A * | 11/1990 | Chinomi | | B60N 2/68 297/452.2 |
| 5,013,089 A * | 5/1991 | Abu-Isa | | A47C 7/282 297/452.2 X |
| D317,533 S * | 6/1991 | Beermann | | D6/356 |
| D321,992 S * | 12/1991 | Butler | | D12/133 |
| 5,437,498 A * | 8/1995 | Waelde | | B60N 2/449 297/452.34 X |
| D374,126 S * | 10/1996 | Sliker | | D6/334 |
| 5,836,648 A * | 11/1998 | Karschin | | B60N 2/2222 297/216.14 |
| 6,139,109 A * | 10/2000 | Lajoie | | A47C 3/12 297/452.34 X |
| 6,151,765 A * | 11/2000 | Asplund | | B60N 2/206 297/440.16 X |
| 6,273,509 B1 * | 8/2001 | Reithmeier | | B60N 2/28 297/410 |
| 6,497,455 B1 * | 12/2002 | Umezawa | | B60N 2/4235 297/452.18 X |
| 6,817,673 B2 * | 11/2004 | Walker | | B60N 2/002 297/440.2 |
| 6,935,672 B2 * | 8/2005 | Dehart | | B60N 2/803 296/68.1 |
| 6,969,114 B2 * | 11/2005 | Keilhauer | | A47C 7/425 297/452.34 X |
| 7,021,710 B2 * | 4/2006 | Kain | | B60N 2/2851 297/440.15 X |
| 7,040,708 B2 * | 5/2006 | Black | | B60N 2/24 297/452.34 |
| 7,096,562 B1 * | 8/2006 | Dehart | | B60N 2/803 29/527.1 |
| 7,168,765 B2 * | 1/2007 | Meiller | | B60N 2/242 297/452.34 X |
| 7,207,407 B2 | 4/2007 | Huber | | |
| 7,472,959 B1 * | 1/2009 | Ratza | | A47C 7/407 297/440.15 X |
| 7,611,199 B2 * | 11/2009 | Michalak | | B60N 2/0232 297/300.2 |
| 7,845,733 B2 * | 12/2010 | Fujita | | B60N 2/42709 297/452.56 X |
| 8,096,621 B2 * | 1/2012 | Braun | | B60N 2/686 297/440.15 X |
| 8,876,206 B2 * | 11/2014 | Yamaguchi | | B60N 2/4228 297/440.2 X |
| 9,381,840 B2 * | 7/2016 | Tobata | | B60N 2/16 |
| 9,493,095 B2 * | 11/2016 | Koike | | B60N 2/643 |
| 10,035,442 B2 * | 7/2018 | Kondrad | | B60N 2/829 |
| 2003/0042783 A1 * | 3/2003 | Potes | | A47C 7/282 297/452.56 |
| 2003/0116999 A1 * | 6/2003 | Fujita | | B60N 2/4228 297/452.34 X |
| 2006/0138848 A1 * | 6/2006 | Balensiefer | | B60N 2/2866 297/440.16 |
| 2006/0152062 A1 * | 7/2006 | Archambault | | B60N 2/80 297/452.34 |
| 2007/0138855 A1 * | 6/2007 | Kespohl | | A47C 7/02 297/452.18 |
| 2008/0136240 A1 * | 6/2008 | Matthews | | B60N 2/4235 297/452.18 X |
| 2010/0231013 A1 * | 9/2010 | Schlenker | | B60N 2/0232 297/216.13 |
| 2011/0241403 A1 * | 10/2011 | Yamaguchi | | B60N 2/4228 297/452.31 |
| 2015/0224899 A1 * | 8/2015 | Menne, III | | B60N 2/914 297/452.18 X |
| 2016/0096461 A1 * | 4/2016 | Coppuck | | B60N 2/68 297/452.18 X |

* cited by examiner

AUTOMOTIVE VEHICLE SEAT WITH INDENTED LOWER SIDE PORTIONS

TECHNICAL FIELD

The present disclosure relates to seats for automotive vehicles including electric vehicles and more particularly to driver seats and passenger seats for first responder or other specialty automotive vehicles, such as law enforcement automotive vehicles.

BACKGROUND

Automotive vehicles typically have one or more seats. The seats are normally designed for comfort and safety of vehicle occupants. In particular, such conventional automotive seats typically include side portions both in the seat bottom and seat back that protrude relative to the main seating surfaces of the seat bottom and seat back so as to provide lateral support to the occupant and constrain lateral movement of a seated passenger or driver, especially in the region where the seat bottom and seat back meet. The present inventors have observed that such conventional seating may be unduly constraining for first responders, such as law enforcement personnel, given the variety of gear that may be worn on the body of such a first responder, and the variety of gear that may occupy the front seat region of a first responder vehicle.

SUMMARY

The present inventors have observed a need for improved vehicle seating for first responder and specialty automotive vehicles, such as law enforcement vehicles. In particular, the present inventors have observed a need for a seat of an automotive vehicle that permits better access to gear worn by a first responder who is a vehicle occupant and that permits greater range of arm motion for such first responders, while maintaining safety considerations for such vehicle occupants.

According to an example, a seat for an automotive vehicle comprises: a seat bottom, the seat bottom comprising a first frame and a seating surface supported by the first frame, the seating surface configured to support an occupant of an automotive vehicle; a first attachment mechanism configured to secure the first frame of the seat bottom to the automotive vehicle; a seat back, the seat back comprising a second frame, the seat back having, above a level at which the seat back meets the seating surface of the seat bottom, an upper portion, and a lower portion, and a middle portion between the upper portion and the lower portion, the upper portion, middle portion and lower portion of the seat back being supported by the second frame; and a second attachment mechanism configured to connect the seat back and the seat bottom. The seat bottom and seat back are configured such that a lateral width of the upper portion of the seat back is greater than a lateral width of the lower portion of the seat back, a lateral width of the seat bottom is greater than the lateral width of the lower portion of the seat back, and a gap is located between the upper portion of the seat back and a rear portion of the seat bottom at one or both of a right side of the seat back and a left side of the seat back.

According to another example, a seat for an automotive vehicle comprises: a seat bottom, the seat bottom comprising a first frame and a seating surface supported by the first frame, the seating surface configured to support an occupant of an automotive vehicle; a first attachment mechanism configured to secure the first frame of the seat bottom to the automotive vehicle; a seat back, the seat back comprising a second frame, the seat back having, above a level at which the seat back meets the seating surface of the seat bottom, an upper portion, and a lower portion, and a middle portion between the upper portion and the lower portion, the upper portion, middle portion and lower portion of the seat back being supported by the second frame; and a second attachment mechanism configured to connect the seat back and the seat bottom. The seat back is configured such that a ratio of a lateral width of the upper portion of the seat back to a lateral width of the lower portion of the seat back is in a range of about 1.2-3.

A method of assembling a seat for an automotive vehicle comprises: providing a seat bottom, the seat bottom comprising a first frame and a seating surface supported by the first frame, the seating surface configured to support an occupant of an automotive vehicle, the seat bottom including a first attachment mechanism configured to secure the first frame of the seat bottom to an automotive vehicle; providing a seat back, the seat back comprising a second frame, the seat back having, above a level at which the seat back meets the seating surface of the seat bottom, an upper portion, and a lower portion, and a middle portion between the upper portion and the lower portion, the upper portion, middle portion and lower portion of the seat back being supported by the second frame; and attaching the seat back to the seat bottom with a second attachment mechanism configured to connect the seat back and the seat bottom. The seat bottom and seat back are configured such that a lateral width of the upper portion of the seat back is greater than a lateral width of the lower portion of the seat back, a lateral width of the seat bottom is greater than the lateral width of the lower portion of the seat back, and a gap is located between the upper portion of the seat back and a rear portion of the seat bottom at one or both of a right side of the seat back and a left side of the seat back.

The subject matter described herein may provide many technical advantages. These advantages may include increased comfort and convenience, faster reaction time to threats and less distraction during such reactions, and increased safety of the seat occupant, especially when the seat occupant is a law enforcement officer, or another person carrying tools on their side or back. Examples of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings generally indicate like elements.

DETAILED DESCRIPTION

Figure 1:
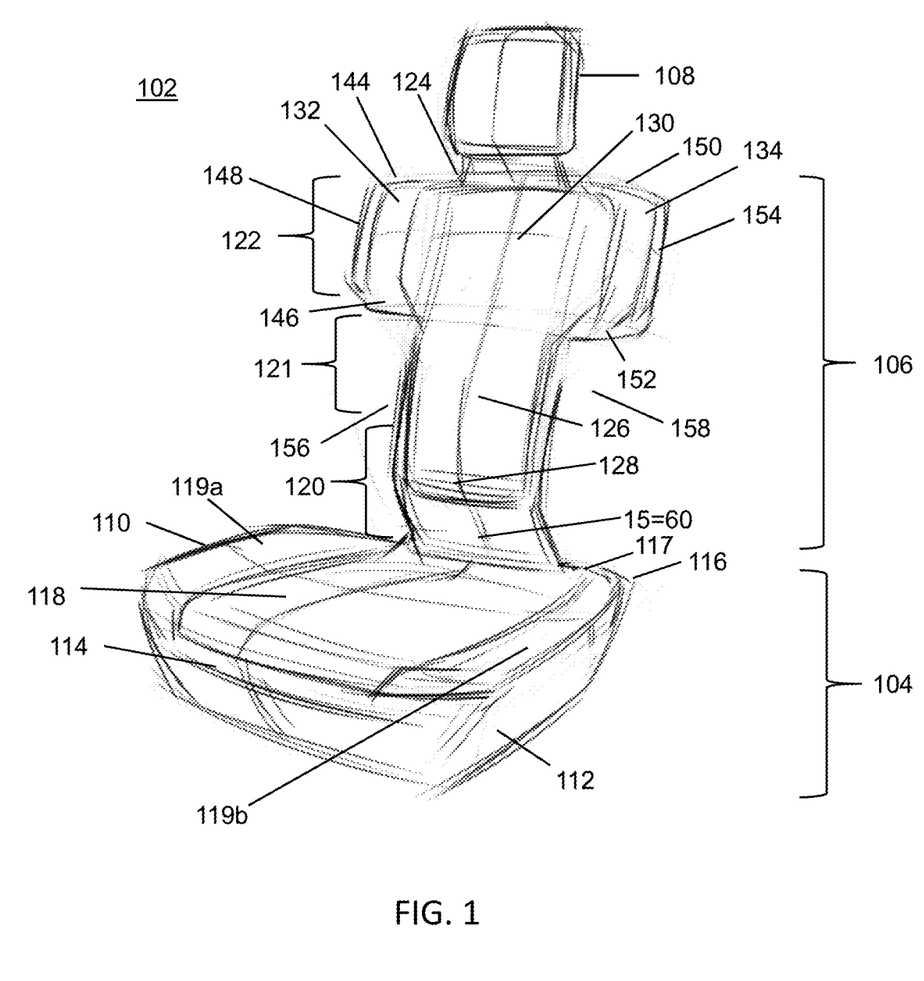
FIG. 1 is a diagram illustrating an example of an automotive vehicle seat according to an exemplary embodiment.

FIG. 1 is a diagram illustrating an example of an automotive vehicle seat 102. Seat 102 may have a seat bottom 104, a seat back 106, and a headrest 108. In vehicle operation, seat bottom 104 may support the weight of a person occupying the seat. Seat bottom 104 may be designed for optimal comfort of the seat occupant, including an appropriate selection of design parameters such as stiffness, durability, aesthetics, materials, temperature control, and ventilation. Seat bottom 104 may have a right upright surface 110, a left upright surface 112, a front upright surface 114, a rear upright surface 116, and a seating surface 118. For the purposes of this description, front, rear, right, and left directions indicate directions with respect to the position of the seat occupant and the orientation of the automotive vehicle in which the seat 102 may be installed (e.g., the front upright surface 114 of the seat 102 is positioned facing toward the front of the automotive vehicle). Typically, a seat occupant faces forward (i.e., in the front direction) when occupying the seat 102.

The orientation of seat surface 118 may be generally horizontal or oriented at a slight angle upward or downward relative to the horizontal in a longitudinal (rear to front) direction, and may further be adjustable using conventional powered or manual seat adjustment mechanisms known in the art. In addition, seat bottom 104 may include elevated side portions 119a and 119b at right and left sides of the seat bottom 104, respectively, protruding generally upward from the plane of the seat surface 118. Such elevated side portions 119a and 119b may be designed to provide improved lateral support for the seat occupant during vehicle turns when the vehicle is in motion, where centrifugal forces may shift the occupant's weight distribution toward the right or the left part of the seat surface 118.

Seat back 106 is designed for supporting the back of the seat occupant. Seat back 106 may be designed to provide comfort to the occupant, which may include selection of the seat back's stiffness, thickness, materials, temperature control, and ventilation. Seat back 106 may also be designed to have high durability and pleasing aesthetic characteristics. Seat back 106 may be attached to seat back bottom 104 via any suitable, movable connection mechanism such as conventionally known in the art to permit the orientation of the seat back 106 to be adjusted relative to the orientation of the seat bottom 104. Seat back 106 and seat bottom 104 may be fabricated using conventional cushioning materials and surface coverings including foam padding, fabric, leather, and the like.

As illustrated in FIG. 1, the exemplary seat back 106 may have a lower portion 120, an upper portion 122, and a middle portion 121 located between the lower portion 120 and the upper portion 122. In operation, lower portion 120 and middle portion 121 may support the lower part and middle part, respectively, of the seat occupant's back. Upper portion 122 may support the upper back and shoulders of the seat occupant. As described further below, the seat back 106 may be configured to provide a first (right) gap 156 between the upper portion 122 of the seat back 106 at a right side thereof and a rear portion 117 of the seat bottom 104. Similarly, the seat back 106 may be configured to provide a second (left) gap 158 between the upper portion 122 of the seat back 106 at a left side thereof and a rear portion 117 of the seat bottom 104. As shown in the example of FIG. 1, a lateral width of the upper portion 122 of the seat back 106 in a lateral direction may be larger than a lateral width of the lower portion 120 and/or larger than a lateral width of the middle portion 121 of the seat back 106. Moreover, a lateral width of the seat bottom 104 may be greater than a lateral width of the lower portion 120 of the seat back and/or greater than a lateral width of a middle portion 121 of the seat back 106.

As shown in FIG. 1, upper portion 122 of the seat back 106 may include a top side 124 and a center portion 130, and may include a right shoulder support 132 and a left shoulder support 134 at right and left sides, respectively, of the center portion 130. Right shoulder support 132 and left shoulder support 134 may protrude in a forward direction relative to a plane of the center portion 130 to provide lateral shoulder support to the seat occupant during turns.

The lower portion 120 of the seat back 106 may include a lumbar support portion 128, which may be a portion of the seat back 106 that is proximate to the seat bottom 104. Middle portion 121 of seat back 106 may have a mid-back support portion 126 located between the lumbar support portion 128 and the upper portion 122 of the seat back 106. A plane of the mid-back support portion 126 may be not coextensive with plane of the lumbar support portion 128. Lumbar support portion 128 may be inclined at an angle relative to a plane of the mid-back support portion 126, e.g., in a range of 5-30 degrees, and in any event, may be adjustable with a suitable lumbar adjustment, e.g., of a conventional type known in the art.

Figures 2A, 2B, 2C, 2D:
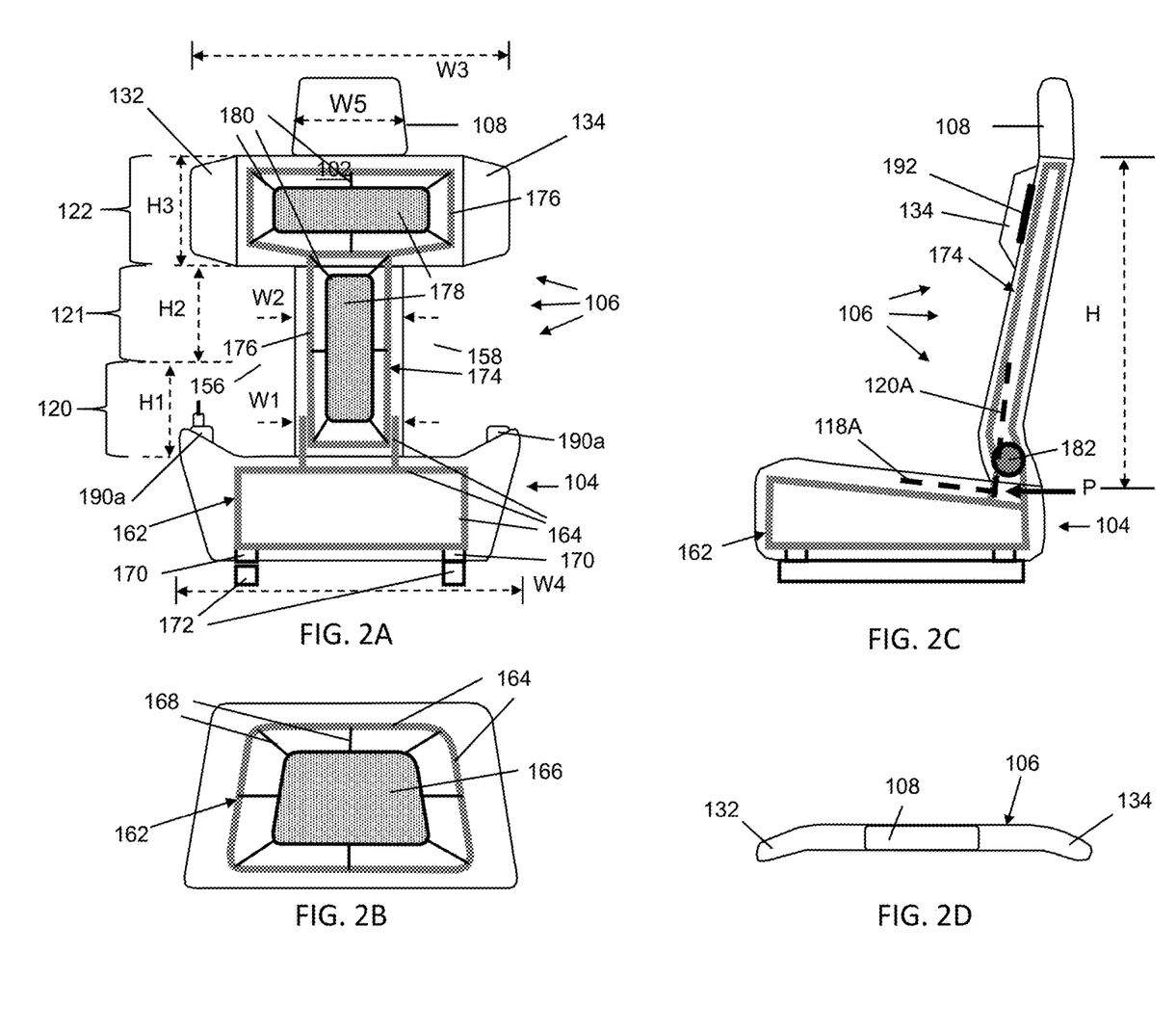
FIGS. 2A-2D are diagrams illustrating additional views of the exemplary automotive vehicle seat of FIG. 1.

FIGS. 2A-2D are diagrams illustrating additional views of the exemplary automotive vehicle seat 102 illustrated in FIG. 1. FIG. 2A is a front, schematic view of the exemplary seat 102 of FIG. 1 and illustrates additional features. As shown in FIG. 2A, the seat bottom 104 comprises a (first) frame 162, which may include one or more frame members 164 formed or attached together in any suitable manner as conventionally known to provide a rigid support structure. The frame 162 provides support for the seating surface 118, which is configured to support an occupant of an automotive vehicle. For example, as shown in FIG. 2B, which illustrates a top, schematic view of the exemplary seat 102 illustrated in FIGS. 1 and 2A, an internal seating support 166, e.g., formed of strong fabric, steel mesh, interconnected spring arrangement, etc., may be connected to the frame 162 via any suitable attachment members 168, e.g., springs, steel wire rods, etc., and a cushion material may be disposed on the support 166 and underneath seating surface 118 in a desired shape and contour to provide a comfortable seating position for the occupant. A first attachment mechanism 170, e.g., such as two steel rails, can be configured to secure the frame 162 of the seat bottom 104 to the automotive vehicle, e.g., via two corresponding steel rails 172 that are attached to the automotive vehicle, such as conventionally known in the art to provide a strong attachment that permits adjusting the front-to-rear position and tilt of the seat bottom 104.

Returning to FIG. 2A, the seat back 106 may comprises a (second) frame 174, which may include one or more frame members 176 formed or attached together in any suitable manner as conventionally known to provide a rigid support structure. For example, one or more internal back supports 178, e.g., formed of strong fabric, steel mesh, interconnected spring arrangement, etc., may be connected to the frame 174 via any suitable attachment members 180, e.g., springs, steel wire rods, etc., and a cushion material may be disposed on the support 178 and underneath a suitable surface material in a desired shape and contour to provide a comfortable back support position for the occupant. As shown in FIG. 2C, which illustrates a side, schematic view of the exemplary seat 102 of FIGS. 1 and 2A, a second attachment mechanism 182 may be configured to connect the seat back 106 to the seat bottom 104, e.g., using a manual or powered movable (e.g., rotatable) connection, such as a hinge mechanism, that permits the occupant to control the angle of inclination of the seat back 106, such as conventionally known in the art.

As noted previously, and as illustrated in FIG. 2A, the seat back 106 includes an upper portion 122, a lower portion 120, and a middle portion 121 disposed between the upper portion 122 and the lower portion 120, all of which are supported by the frame 174. In this example, the seat bottom 104 and the seat back 106 may be configured such that a lateral width W3 of the upper portion 122 of the seat back 106 may be greater than a lateral width W1 of the lower portion 120 of the seat back 106. In addition, a lateral width W4 of the seat bottom may be greater than the lateral width W1 of the lower portion 120 of the seat back 106. Further, a gap 156 may be located between the upper portion 122 of the seat back 106 and a rear portion of the seat bottom 104 at the right side of the seat back 106, and/or a gap 158 may be located between the upper portion 122 of the seat back 106 and a rear portion of the seat bottom 104 at the left side of the seat back 106. The gaps 156 and 158 each correspond to a lateral indentation in the seat back 106 that forms an empty space between the upper portion 122 and the lower portion 120 of the seat back 106. Moreover, a lateral width W3 of the upper portion 122 of the seat back 106 may be greater than a lateral width W2 of the middle portion 120 of the seat back 106. The widths W1, W2, W3 and W4 of the lower portion 120, middle portion 121, upper portion 122 and seat bottom 104 need not be constant over the span of such structures, and each of those widths may be any of an average width, a maximum width, a minimum width, a center-point width in the upright direction, or a constant width of the span of the respective structure, for example.

The width W3 of the upper portion 122 of the seat back 106 may include within its span the right shoulder support 132 and the left shoulder support 134, which as noted previously, may protrude in a forward direction relative to a plane of the center portion 130 so as to provide lateral shoulder support to the seat occupant during turns. FIG. 2D illustrates a top, schematic view of the upper portion 122, showing the protruding right shoulder support 132 and the left shoulder support 134, whose surface may be angled forward relative to a plane of the center portion 130 of the upper portion 122 of the seat back 106, e.g., by an angle in the range of, e.g., 3 about 0-45 degrees, for instance. The amount of protrusion of portions 132 and 134 relative to the surface of center portion 130 may be in the range of, e.g., about 2-5 inches, for instance.

In an example, the upper portion 122 of the seat back 106 may correspond to an upper one-third of the seat back 106 in an upright direction, the lower portion 120 of the seat back 106 may correspond to a lower one-third of the seat back 106, and the middle portion 121 of the seat back 106 may correspond to a middle one-third of the seat back 106. Positions and heights of the lower, middle and upper portions 120, 121 and 122, respectively, may be specified relative to (above) a level at which the seat back 106 meets a rear portion (e.g., a rear one-half or a rear one-third) of the seating surface 118 of the seat bottom 104. The language "meets" in this regard does not require that a forward facing surface of the seat back 106 must necessarily be in actual, physical contact with a rear portion of the seating surface 118 of the seat bottom 104, but is intended to convey that such level may coincide with an intersection point where a mathematical plane representative of (e.g., coextensive with) a rear portion of the seating surface 118 intersects a mathematical plane representative of (e.g., coextensive with) the lower portion 120 of the seat back 106. An example of such a level is illustrated by level "P" shown by the bold arrow in FIG. 2C, which illustrates a side, schematic view of the exemplary seat 102 shown in FIGS. 1 and 2A. As shown in FIG. 2C a mathematical plane 118A representative of a rear portion of the seating surface 118 and a mathematical plane 120A representative of the lower portion 120 of the seat back 106 may intersect at a level "P" which can provide a reference point for the positions and heights of the lower, middle and upper portions 120, 121, 122, respectively, of the seat back 106. As a practical matter, the position of this level "P" is relatively insensitive to typical variations in the angle of inclination of the seat back 106, particularly as it pertains to identifying a lower third, middle third, and upper third of the seat back 106.

As shown in FIGS. 2A and 2C, the exemplary seat 102 may comprise a headrest 108 attached to the seat back 106, e.g., via a vertical height adjustment mechanism comprising one or two sliding posts attached to the headrest 108 that slide into corresponding sleeves mounted to the frame 174 of the seat back 106 as conventionally known in the art. In this case, the headrest may be a separate and distinct structure from the seat back 106. Alternatively, the headrest 108 may be integrated into the seat back with no specific line or demarcation between the upper portion 122 of the seat back 106 and the headrest 108. In such a case, a top one-fourth of a distance from a rear portion of the seat bottom 104 to the top of the head rest 108 may constitute (be attributable to) the headrest 108, and the remaining distance between that top one-fourth and the rear portion of the seat bottom 104 may constitute (be attributable to) the seat back 106. In either case or in other examples, the headrest 108 may have a lateral width W5 (e.g., an average width, maximum width, minimum width, constant width, a center-point width in the upright direction,) that is smaller than the lateral width W3 of the upper portion 122 of the seat back 106.

Referring to the example of FIG. 2A, exemplary dimensions for the exemplary seat 102 may include, for instance, the following. A lateral width W4 of the seat bottom 104 may be in a range of about 18-24 inches, e.g., about 22 inches. A height of the seat back may be in the range of about 18-24 inches, e.g., about 22 inches. As shown in FIG. 2A, an overall height of the seat back 106 may comprise the combined height of a height H1 of the lower portion 120, a height H2 of the middle portion 121, and a height H3 of the upper portion 122, such that H1+H2+H3 equals a total height of the seat back 106. A longitudinal depth of the seat bottom 104 may be in a range of about 16-22 inches, e.g., about 20 inches. A lateral width W1 of the lower portion 120 of the seat back 106 may be in a range of about 8-20 inches, about 10-18 inches, about 8-14 inches, e.g., about 8 inches, about 10 inches, about 12 inches, about 14 inches, etc. A lateral width W2 of the middle portion 121 of the seat back may be in a range of about 8-20 inches, about, 10-18 inches, about 8-14 inches, e.g., about 8 inches, about 10 inches, about 12 inches, about 14 inches, etc. A lateral width W3 of the upper portion 122 of the seat back may be in a range of about 16-24 inches, about 16-22 inches, about 18-22 inches, e.g., about 16 inches, about 18 inches, about 20 inches, about 22 inches, etc. A lateral width W5 of the headrest 108 may be in a range of about 6-12 inches, e.g., about 8 inches, about 10 inches, etc. Each of the widths of the different portions/structures referred to above may be any of an average width, a maximum width, a minimum width, a center-point width in the upright direction, or a constant width of the respective portion/structure. In examples, a distance between portions of upright frame members 176 of the frame 174 of seat back 106 in the region of the upper portion 122 may be in the range of about 14-22 inches, about 16-20 inches, e.g., about 16 inches, about 18 inches, about 20 inches, about 22 inches, etc. In examples, a distance between portions of upright frame members 176 of the frame 174 of seat back 106 in the region of the lower portion 120 may be in the range of about 6-18 inches, about 8-16 inches, about 10-14 inches, e.g., about 6 inches, about 8 inches, about 10 inches, about 12 inches, about 14 inches, etc.

In addition, for example, a ratio of a width W3 of the upper portion 122 to a width W1 of the lower portion 120, and/or a ratio of the width W3 of the upper portion 122 to a width W2 of the middle portion 121, may be in a range of about 1.2-3.0, a range of about 1.2-1.4, a range of about 1.3-1.7, a range of about 1.5-2.0, a range of about 1.5-2.5, a range of about 2.0-2.5, a range of about 2.0-3.0, or a range of about 1.5-2.0, such as, e.g., about 1.2, about 1.3, about 1.5, about 1.7, about 2.0, about 2.5, about 3.0, etc. The ranges of 1.3-1.7 and 2.0 to 2.5 can be advantageous, for example, because they can provide benefits of several inches of clearance or more of lateral clearance at one or both sides at lower portion 120 of the seat back 106 while maintaining good structural strength and torsional stability of the seat back 106 overall. Additionally, for example, a width W1 of the lower portion 120 of seat back 106 may be narrower that a width W4 of the seat bottom 104. For example, a ratio of the width of the seat bottom W4 104 to the width W1 of the lower portion 120 of seat back 106 may be in a range of about 1.1-3.0, a range of about 1.1-1.4, a range of about 1.3-1.7, a range of about 1.5 to 2.0, a range of about 1.5-2.5, a range of about 2.0-2.5, a range of about 2.0-3.0, or a range of about 1.5-2.0, such as, e.g., about 1.1, about 1.3, about 1.5, about 1.7, about 2.0, about 2.5, about 3.0, etc. Each of the widths of the different portions/structures referred to above may be any of an average width, a maximum width, a minimum width, a center-point width in the upright direction, or a constant width of the respective portion/structure.

Referring again to FIG. 1, additional exemplary aspects will now be described. Right shoulder support 132 includes a top surface 144, a bottom surface 146, and a right surface 148. Left shoulder support 134 includes a top surface 150, a bottom surface 152, and a left surface 154. One or both of the top surface 144 of the right shoulder support 132 and the top surface 150 of the left shoulder support 134 may be parts of the top side 124 of the upper portion 122 of the seat back 106.

One or more of the top surface 144 of the right shoulder support 132, the bottom surface 146 of the right shoulder support 132, the top surface 150 of the left shoulder support 134, and the bottom surface 152 of the left shoulder support 134, may be substantially horizontal, or, as shown in FIG. 2A, those surfaces may be angled upward or downward. The right surface 148 of the right shoulder support 132 and the left surface 154 of the left shoulder support 134 may be substantially vertical. The top surface 144 of the right shoulder support 132 and the bottom surface 146 of the right shoulder support 132 may be substantially parallel to each other, or, as shown in FIG. 2A, may be angled downward and upward, respectively. The top surface 150 of the left shoulder support 134 and the bottom surface 152 of the left shoulder support 134 may be substantially parallel to each other, or, as shown in FIG. 2A, may be angled downward and upward, respectively. The right surface 148 of the right shoulder support 132 may be substantially parallel to the left surface 154 of the left shoulder support 134. A configuration of "substantially parallel" in this regard means that planes or surfaces are at an angle of less than about fifteen degrees to each other.

As shown in FIGS. 1 and 2A, the narrower width W1 of the lower portion 120 of the seat back 106 relative to either or both of the upper portion 122 of the seat back 106 and the rear portion 117 of the seat bottom 104 may form one or two of gaps 156 and 158. Right gap 156 may be formed between the bottom face 146 of the right shoulder support 132 and a right side of the rear portion 117 of the seat bottom 104, adjacent to a right side of the lower portion 122 and/or middle portion 121 of the seat back 106. Similarly, left gap 158 may be formed between the bottom face 152 of the left shoulder support 134 and a left side of the rear portion 117 of the seat bottom 104, adjacent to a left side of the lower portion 122 and/or middle portion 121 of the seat back 106. The gap 156 and gap 158 are formed by lateral indentations in the seat back 106, including lateral indentations in the frame 176, that form empty spaces at those locations. Seat 102 may have include both a right gap 156 and a left gap 158, or only one of these two gaps. If the seat 102 has only the right gap 156 and does not have left gap 158, then such seat may be preferably positioned on the right side of the vehicle. If the seat 102 has only the left gap 158 and does not have the right gap 156, then such seat may be preferably positioned on the left side of the vehicle.

If lumbar support 128 is position forward of mid-back support 126, and forward of the rear portion 117 of seat surface 118, then a bottom pocket 160 is formed between the lumbar support 128 and the seat bottom 104. Such bottom pocket 160 may be formed that may provide space for one or more tools or other gear carried on a backside of a gear belt that a law enforcement officer or other occupant of the vehicle may be wearing while seated in seat 102. Seat 102 may include both the bottom pocket 160 and one or both of the side gaps 156 and 158

Referring again to FIG. 2A, (first) seat frame 162 of the seat bottom 104 may support a first seat belt mechanism 190a and a second seat belt mechanism 190b that mates with a seat belt from mechanism 190a, as conventionally understood by those of skill in the art. In addition, referring to FIG. 2C, (second) seat frame 174 of the seat back 106 may have or provide mounting support for a side airbag 192.

Figure 3:
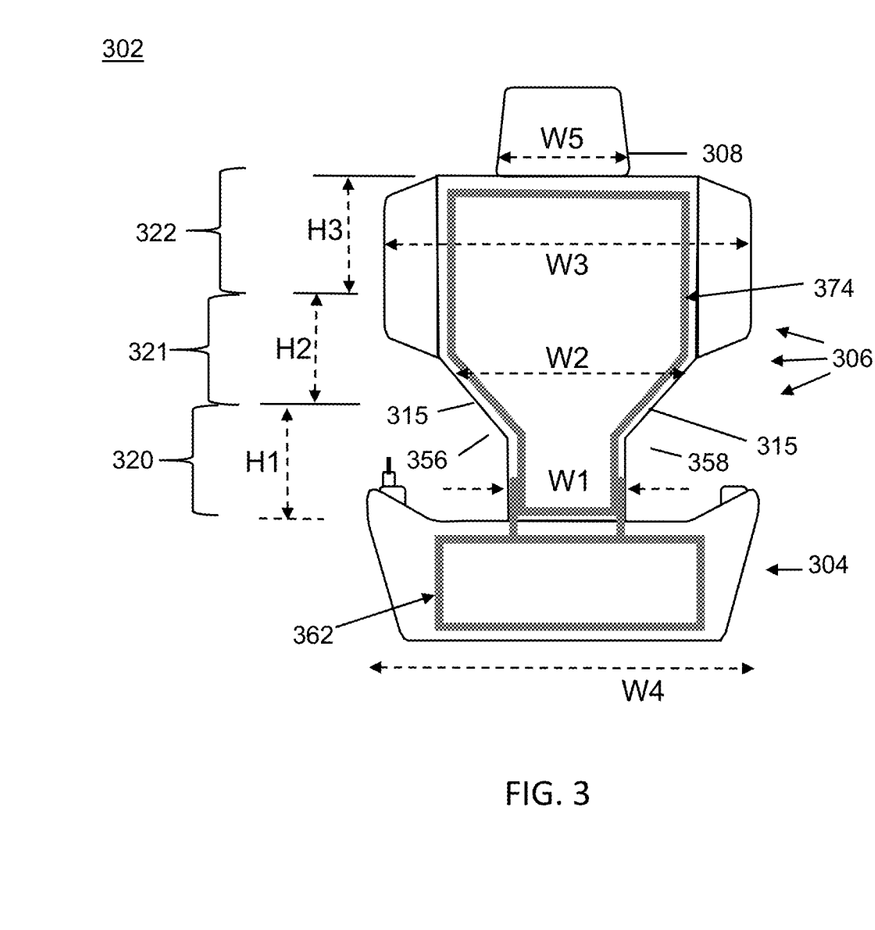
FIG. 3 is a diagram illustrating another example of an automotive vehicle seat according to an exemplary embodiment.

FIG. 3 illustrates a front, schematic view of another exemplary seat 302 according to the disclosure. As shown in FIG. 3, the seat 302 may include a seat bottom 304 including a first frame 362, a seat back 306 including a second frame 374, and a head rest 308. Such as described previously, the seat back 306 may be divided into thirds in an upright direction, e.g., a bottom third corresponding to lower portion 320 of the seat back 306, a middle third corresponding to a middle portion 320, and an upper third corresponding to an upper portion 322. As shown in FIG. 3, an overall height of the seat back 306 may comprise the combined height of a height H1 of the lower portion 320, a height H2 of the middle portion 321, and a height H3 of the upper portion 322, such that H1+H2+H3 equals a total height of the seat back 306. Seat 302 includes gaps 356 and 358 in seat back 306 similar to gaps 156 and 158 of seat back 106 described in connection with FIGS. 1 and 2A.

In this example, an intermediate portion of the seat back in the region of the lower portion 320 and/or middle portion 321 may be indented and have angled, non-vertical sides 315 at a right side and/or a left side of the seat back 306, in contrast to the example of FIGS. 1 and 2A, in which the lower portion 120 and middle portion 121 had constant widths and had vertically oriented right and left sides. In an instance such as shown in FIG. 3, it is possible that one or more of the lower portion 320, middle 321, and upper portion 322 (each of which may span approximately one-third of the seat back 306 in an upright direction) may not have a constant width. Nevertheless, a width W3 of the upper portion 322, which in this example may be an average width, a maximum width, a minimum width, or a width at a center portion of such portion in the upright direction (also called a center-point width in the upright direction), may be greater than a width W1 of the lower portion 320, which in this example may be an average width, a maximum width, a minimum width, a center-point width in the upright direction, or a constant width (if the width is constant), for instance. Similarly, a width W3 of the upper portion 322 may be greater than a width W2 of the middle portion 321, which in this example may be an average width, a maximum width, a minimum width, a center-point width in the upright direction, or a constant width (if the width is constant), for instance. In other respects, the description of exemplary seat 102 is applicable to the exemplary seat 302, and such description is not repeated here.

It will be appreciated that the exemplary vehicle seat 102, 302 such as described herein may provide substantial advantages over conventional seating in law enforcement vehicles or other first responder or specialty vehicles by providing occupant seating that permits greater freedom of movement and/or additional seating space for gear-wearing seat occupants via the gaps 156 and 158 formed at the seat back 106. Law enforcement officers typically carry weapons and other tools that may be attached to their belts or otherwise carried on their bodies. In addition, law enforcement vehicles typically include other gear positioned proximate to a front seat of a driver and/or a passenger, for example, such as laptop computers, other electronic equipment, other weapons and corresponding holders, and other law enforcement devices for which quick and easy access within arm's reach may typically be required. Such equipment may take up substantial room in the cabin of the law enforcement vehicle that otherwise would be available to permit free movement for occupants in a conventional vehicle. Such body-worn equipment and cabin-mounted equipment can undesirably constrain the movements of law enforcement personnel seated at the front seat of such a law enforcement vehicle.

In vehicles with conventional seating, law enforcement personnel may have difficulty accessing their weapons or other tools, especially when a fast reaction to a threat or to another law enforcement situation is required. In a conventional seat of a conventional law enforcement vehicle, a backward movement of the arm taken in order reach the officer's belt-worn weapon may be constrained by a lateral portion back of the seat back, and access to the weapon itself may be obscured by a lower lateral portion of the seat back. Accordingly, a police officer may seek to move her body forward and/or sideways in order to allow for the arm movement required to access a weapon. However, such forward movement of the body may be restricted by a seat belt and/or by presence of special equipment in the police car. As a result, in some cases, a police officer may opt to refrain from using her seat belt in order to have more freedom of movement in order be able to react to threats quickly. Not using the seat belt may endanger officer's safety.

Accordingly, the exemplary seat 102 having one or both pockets 156 and 158 allows the seat occupant easy access to a tool or a weapon located on the side corresponding to the side of the pocket and promote safety of the occupant. In addition, exemplary seat 102 with the gap 156 and/or the gap 158 provides for freedom of movement, such that an arm can freely swing backward to enable fast and easy access to police officer's weapon. Because of the presence of the gap 156 and/or gap 158, such movement can be made even with a seat belt properly fastened. Such configuration is especially useful for law enforcement officers, such as police officers, who may need to be able to quickly access a side firearm or another weapon located near that person's waist. If a police officer needs to swing his arm backward to quickly access a weapon to respond to a threat or a law enforcement situation, the gap 156, 158 permits ease of such movement. In contrast, with a conventional seat, such motion may be obstructed by the back of the seat. Thus, while a police officer seated in a conventional seat may opt not to use his or her seat belt so as to allow themselves a freedom of body movement to be able to quickly access their weapon, a policemen seated in the exemplary seat 102 described herein may be more inclined to wear a seat belt with confidence.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. It should also be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply. In addition, as used in the description herein and throughout the claims that follow, the meaning of "about" and/or "approximately" refers to ±10% of the quantity indicated, unless otherwise indicated. In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. Other implementations may be within the scope of the following claims.

What is claimed is:
1. A seat for an automotive vehicle, comprising:
 a seat bottom, the seat bottom comprising a first frame and a seating surface supported by the first frame, the seating surface configured to support an occupant of an automotive vehicle;

a first attachment mechanism configured to secure the first frame of the seat bottom to the automotive vehicle;
a seat back, the seat back comprising a second frame, the seat back having, above a level at which the seat back meets the seating surface of the seat bottom, an upper portion, a lower portion, and a middle portion between the upper portion and the lower portion, the upper portion, middle portion and lower portion of the seat back being supported by the second frame, the upper portion, middle portion, and lower portion of the seat back correspond to an upper third, middle third, and lower third of the seat back in an upright direction along the seatback, respectively; and
a second attachment mechanism configured to connect the seat back and the seat bottom, the seating surface at a rear of the seat bottom being disposed lower than a rotation axis of the second attachment mechanism,
the seat bottom and seat back being configured such that
a lateral width of the upper portion of the seat back is greater than a lateral width of the lower portion of the seat back,
a lateral width of the upper portion of the seat back is greater than a lateral width of the middle portion of the seat back,
a lateral width of the middle portion of the seat back is greater than a lateral width of the lower portion of the seat back,
a lateral width of the seat bottom is greater than the lateral width of the lower portion of the seat back, and
a gap is located between the upper portion of the seat back and a rear portion of the seat bottom at one or both of a right side of the seat back and a left side of the seat back.

2. The seat of claim 1, comprising a headrest attached to the seat back or integrated into the seat back, the headrest having a lateral width smaller than the lateral width of the upper portion of the seatback.

3. The seat of claim 1, the middle portion of the seat back having a laterally tapered shape such that a lateral width of the middle portion of the seat back varies in a side-to-side direction with location in a vertical direction.

4. The seat of claim 3, the seat back being configured such that: the upper portion of the seat back has an average lateral width in the range of 18-24 inches, and the lower portion of the seat back has an average lateral width in the range of 8-14 inches.

5. The seat of claim 1, the lateral width of the upper portion of the seat back being an average width or a maximum width of the upper the portion of the seat back, and the lateral width of the lower portion of the seat back being an average width or a maximum of the lower portion of the seat back.

6. The seat of claim 1, the gap corresponding to a lateral indentation in the seat back that forms an empty space.

7. A seat for an automotive vehicle, comprising:
a seat bottom, the seat bottom comprising a first frame and a seating surface supported by the first frame, the seating surface configured to support an occupant of an automotive vehicle;
a first attachment mechanism configured to secure the first frame of the seat bottom to the automotive vehicle;
a seat back, the seat back comprising a second frame, the seat back having, above a level at which the seat back meets the seating surface of the seat bottom, an upper portion, and a lower portion, and a middle portion between the upper portion and the lower portion, the upper portion, middle portion and lower portion of the seat back being supported by the second frame, the upper portion, middle portion, and lower portion of the seat back correspond to an upper third, middle third, and lower third of the seat back in an upright direction along the seatback, respectively; and
a second attachment mechanism configured to connect the seat back and the seat bottom, the seating surface at a rear of the seat bottom being disposed lower than a rotation axis of the second attachment mechanism, the seat back being configured such that a ratio of a lateral width of the upper portion of the seat back to a lateral width of the lower portion of the seat back is in a range of about 1.3-3.0,
a lateral width of the upper portion of the seat back is greater than a lateral width of the middle portion of the seat back, and
a lateral width of the middle portion of the seat back is greater than a lateral width of the lower portion of the seat back.

8. The seat of claim 7, comprising a headrest attached to the seat back or integrated into the seat back, the headrest having a lateral width smaller than the lateral width of the upper portion of the seatback.

9. The seat of claim 7, the middle portion of the seat back having a laterally tapered shape such that a lateral width of the middle portion of the seat back varies in a side-to-side direction with location in a vertical direction.

10. The seat of claim 2, the lateral width of the upper portion of the seat back being an average width or a maximum width of the upper the portion of the seat back, and the lateral width of the lower portion of the seat back being an average width or a maximum of the lower portion of the seat back.

11. The seat of claim 7, a gap being located between the upper portion of the seat back and a rear portion of the seat bottom at one or both of a right side of the seat back and a left side of the seat back, the gap corresponding to a lateral indentation in the seat back that forms an empty space.

12. A method of assembling a seat for an automotive vehicle, the method comprising:
providing a seat bottom, the seat bottom comprising a first frame and a seating surface supported by the first frame, the seating surface configured to support an occupant of an automotive vehicle, the seat bottom including a first attachment mechanism configured to secure the first frame of the seat bottom to an automotive vehicle;
providing a seat back, the seat back comprising a second frame, the seat back having, above a level at which the seat back meets the seating surface of the seat bottom, an upper portion, and a lower portion, and a middle portion between the upper portion and the lower portion, the upper portion, middle portion and lower portion of the seat back being supported by the second frame, the upper portion, middle portion, and lower portion of the seat back correspond to an upper third, middle third, and lower third of the seat back in an upright direction along the seatback, respectively; and
attaching the seat back to the seat bottom with a second attachment mechanism configured to connect the seat back and the seat bottom, the seating surface at a rear of the seat bottom being disposed lower than a rotation axis of the second attachment mechanism,
the seat bottom and seat back being configured such that a lateral width of the upper portion of the seat back is greater than a lateral width of the lower portion of the seat back, a lateral width of the upper portion of the seat back is greater than a lateral width of the middle portion of the seat back, a lateral width of the middle portion of the seat back is greater than a lateral width of the lower portion of the seat back, a lateral width of the seat bottom is greater than the lateral width of the lower portion of the seat back, and a gap is located between the upper portion of the seat back and a rear portion of the seat bottom at one or both of a right side of the seat back and a left side of the seat back.

13. The method of claim 12, wherein a ratio of a lateral width of the upper portion of the seat back to a lateral width of the lower portion of the seat back is in a range of about 1.3-3.0.

14. The method of claim 13, attaching a headrest to or integrating a headrest into the seat back, the headrest having a lateral width smaller than the lateral width of the upper portion of the seatback.

15. The method of claim 13, the middle portion of the seat back having a laterally tapered shape such that a lateral width of the middle portion of the seat back varies in a side-to-side direction with location in a vertical direction.

16. The method of claim 12, the lateral width of the upper portion of the seat back being an average width or a maximum width of the upper the portion of the seat back, and the lateral width of the lower portion of the seat back being an average width or a maximum width of the lower portion of the seat back.

17. The method of claim 12, a gap being located between the upper portion of the seat back and a rear portion of the seat bottom at one or both of a right side of the seat back and a left side of the seat back, the gap corresponding to a lateral indentation in the seat back that forms an empty space.

* * * * *